United States Patent [19]

Gruler et al.

[11] Patent Number: 5,416,703

[45] Date of Patent: May 16, 1995

[54] METHOD AND APPARATUS FOR AUTOMATIC DETERMINATION OF THE ASSIGNMENT OF DIRECTIONAL SENSORS TO THE MOVING DIRECTIONS OF A VEHICLE

[75] Inventors: Martin Gruler, Brühlweg; Harald Jeschonneck, Villingen-Schwenningen; Gernot Hilger, Trossingen, all of Germany

[73] Assignee: Mannesmann Kienzle GmbH, Villingen-Schwenningen, Germany

[21] Appl. No.: 927,033

[22] Filed: Aug. 6, 1992

Related U.S. Application Data

[63] Continuation-in-part of Ser. No. 882,707, May 14, 1992, abandoned.

[30] Foreign Application Priority Data

May 14, 1991 [DE] Germany .................. 41 15 694.3

[51] Int. Cl.[6] .................................. G06F 15/20
[52] U.S. Cl. .................... 364/424.05; 340/438
[58] Field of Search .............. 364/424.01, 424.03, 364/424.04, 424.05, 436; 340/436, 438, 439

[56] References Cited

U.S. PATENT DOCUMENTS

| | | | |
|---|---|---|---|
| 4,836,024 | 6/1989 | Woehrl et al. | 340/436 |
| 4,928,242 | 5/1990 | Suzuki et al. | 364/424.03 |
| 4,933,882 | 6/1990 | Molnar et al. | 364/424.03 |
| 4,939,652 | 7/1990 | Steiner | 364/424.03 |
| 5,085,464 | 2/1992 | Behr et al. | 340/436 |
| 5,212,640 | 5/1993 | Matsuda | 364/424.03 |
| 5,270,708 | 12/1993 | Kamishima | 364/436 |

*Primary Examiner*—Gary Chin
*Attorney, Agent, or Firm*—Anderson Kill Olick & Oshinsky

[57] ABSTRACT

A method and apparatus for the automatic determination of the assignment of directional sensors to the moving directions of a vehicle is described wherein signals and/or their time derivatives, obtained during specific time intervals, from sensors associated with a measuring device which are utilized for acquiring the dynamics of a vehicle are linked-up with signals generated by a system of the vehicle which is assigned, in an explicit and previously known manner, to the movement direction of the vehicle. The method and apparatus achieves, in the operation of the data acquisition apparatus, the automatic assignment of the moving directions of the vehicle to the sensors of the measuring device.

12 Claims, 3 Drawing Sheets

METHOD AND APPARATUS FOR AUTOMATIC DETERMINATION OF THE ASSIGNMENT OF DIRECTIONAL SENSORS TO THE MOVING DIRECTIONS OF A VEHICLE

This is a continuation-in-part of application Ser. No. 07/882,707, filed May 14, 1992, now abandoned.

FIELD OF THE INVENTION

The invention is directed to a method and apparatus for the automatic determination of the assignment of directional sensors to the moving direction of a vehicle, wherein the measuring apparatus comprising the directional sensors, as well as an evaluation unit for interpretation of the linked data signals, are components of a data acquisition apparatus, which can for example, be utilized as an accident data memory system which is capable of reconstructing the motion path or track of the vehicle's movement.

BACKGROUND OF THE INVENTION

Data acquisition apparatus are known as far as their technical structure is concerned. Thus, it is known from EP 0 118 818 B1, that the data acquisition apparatus, configured as "black boxes" record data of the vehicle dynamics such as longitudinal and lateral acceleration and also chronologically synchronous information which pertains to the state of the vehicle, as for instance, a directional or turn signal function. It has also been proposed to integrate a magnetic field dependent measuring device for acquiring, by appropriate sensors, the non-linear motion of the vehicle into a data acquisition system in order to make the motion track of the vehicle completely reconstructible.

The knowledge of the installation position of the data acquisition system, in which the sensors are rigidly arranged, is of important significance for the meaningful task conforming signal evaluation of these directional sensors. Therefore, there is a necessity for the designation of the specified installation positions, e.g., by markings at the housing of the apparatus. The proper functioning of the apparatus therefore demands the observance of precise installation instructions, which places significant requirements upon assembly or installation. Upon subsequent installation of the data acquisition apparatus, one encounters in actual practice, significant arrangement problems which results from the sizes of the components which have to be enclosed. There are usually space constraints which makes accessibility difficult for the assembly or installation given the few permissible installation areas which are also limited by safety aspects. This entails mostly a complicated and thus an expensive installation for the user which may result in a considerable acceptance problem for such vehicle data acquisition apparatus which usually are voluntarily installed.

SUMMARY OF THE PRESENT INVENTION

The present invention provides a method of and apparatus for performing the task of simplifying the installation of the data acquisition apparatus. The inventive method and apparatus also permit to render the proper functioning of the directional measuring device independent of the installed position of the apparatus.

The method and apparatus of the present invention are characterized by comparing the signals of the identical directional sensors with each other and by selecting that sensor, as a source of data for a specific vehicle motion direction, by means of a logic signal link and a signal evaluation, which upon the appearance of at least one additional signal, supplies expected significant measured value changes. This additional signal is generated by another vehicle system which is assigned to a directional motion of the vehicle. Not only are the signals of the identical sensors compared with one another as to their absolute magnitudes, but the time derivatives (d/dt) of these signals may also be compared with one another with the results obtained utilized in the method and apparatus of the present invention.

The present invention provides a distinct advantage in that the measuring arrangement, usually constructed with two channels for each type of sensor for acquisition of vehicle dynamics, can be built to be absolutely sensor identical or directionally neutral as far as their sensors are concerned. Further, the manufacturer is not obliged to determine, in-plant which sensor channel is provided for acquiring the vehicle longitudinal or transverse dynamics. The present invention dispenses with the need for markings on the housings of the data acquisition apparatus and for directional installation instructions. Further, it is unnecessary to note the directional installation position of the apparatus with respect to the vehicle, such as for obtaining a readout of the data in an external data processing department, for reconstructing the history of an accident, the knowledge of which is absolutely necessary for the reconstruction of the vehicle motion path or track when removing the data acquisition apparatus.

This aspect is also considerably advantageous for the user of the data acquisition apparatus, because it enables a free selection of the installation direction of the data acquisition apparatus in a nearly random manner with respect to the principal axes of the vehicle without running the danger of a mistake. The apparatus can thus be installed by anyone in a simple manner without having to depend on a specialized shop department. It should however be observed, that because of the sensors being typically arranged orthogonally with respect to one another, installation positions are undesirable where the sensor's principal axes are exactly at an angle of 45° to the principal moving directions of the vehicle.

The method and apparatus of the present invention discerns automatically, by a logic signal link and the evaluation of significant measured signal shapes, which part of the sensor measuring arrangement acquires which directional component. The sensor which supplies the more significant of the measured signal changes within a specific time interval is associated with a specific direction in space. Manual intervention into the hardware of the data acquisition system is unnecessary. Also, no surveying or calibration is required for the installation of the apparatus into the vehicle, which is particularly advantageous for use by the general public, e.g., of an apparatus which is designed especially as accident data memory which is suitable for private vehicles.

It is an advantage of the present invention that it provides an apparatus for data acquisition which can be utilized to acquire data representative of a vehicle's motion and which is simple to install and which further functions independently of the installation position of the data acquisition apparatus.

Another advantage of the present invention that it provides a method of and apparatus for data acquisition which does not require a determination of a sensor channel for the acquisition of data representative of a vehicle's dynamics, but instead provides a method and apparatus for data acquisition which are directionally neutral.

It is yet another advantage of the present invention that it provides a method of and apparatus for data acquisition which automatically determine which sensor in the arrangement has acquired a directional signal component.

It is still another advantage of the present invention that it provides a method of and apparatus for data acquisition which require no survey or calibration prior to the installation of the data acquisition apparatus into the vehicle.

The features and advantages of the present invention will be made apparent to those skilled in the art after a review of the Description of the Preferred Embodiment taken in conjunction with the drawings which follow.

DESCRIPTION OF THE PREFERRED EMBODIMENT

Figure 1:
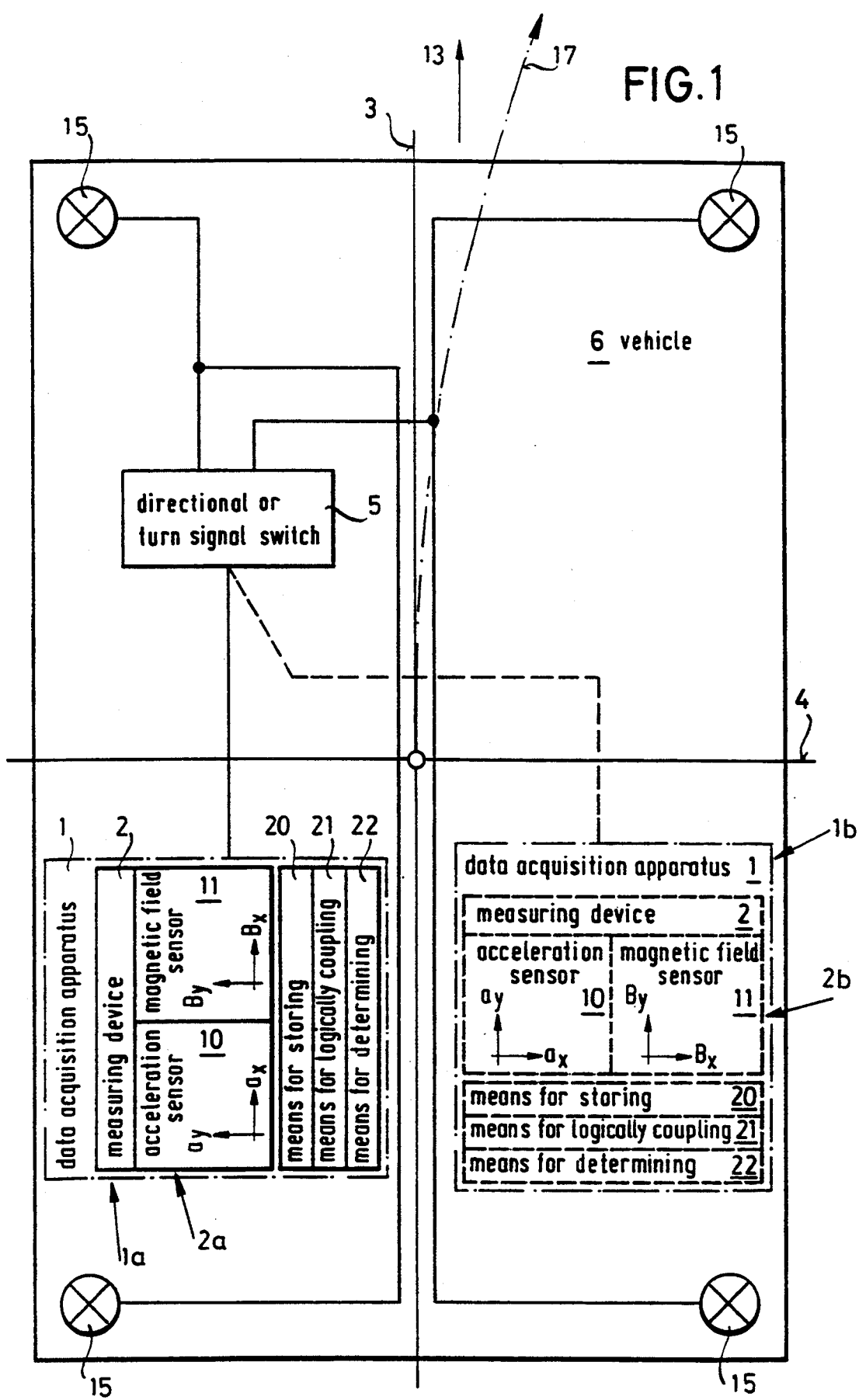
FIG. 1 illustrates a data acquisition apparatus which is the subject of the present invention wherein a directional or turn signal is utilized as the vehicle or system link-up signal.

FIG. 1 illustrates a data acquisition apparatus which along with the method of use thereof is the subject of the present invention and which is denoted generally by the reference numeral 1. The data acquisition apparatus 1 is shown situated within vehicle 6. The data acquisition apparatus 1 comprises a measuring device 2 which is utilized in acquiring sensor data which is representative of the dynamics or motion of the vehicle 6, which for instance, may be determined by measuring the acceleration a of the vehicle and/or the magnetic field B which surrounds the vehicle at any given instance. Typically, the measuring device 2 is arranged within the data acquisition apparatus 1 as illustrated in FIG. 1. The data acquisition apparatus 1 may be lead-sealed by the manufacturer in order to prevent the unauthorized access to or the tampering with the apparatus 1. Generally, measuring device 2 is not provided with means for the manual input of data by an operator.

The user of the data acquisition apparatus 1, especially if the apparatus is designed as an accident data memory, may install the apparatus himself in a nearly random manner with respect to the three-dimensional axes of the vehicle. Installation positions 1a/2a or 1b/2b are given as examples. Therefore, it is necessary that when the apparatus 1 is utilized, it automatically recognizes or determines in which position with respect to the vehicle's longitudinal axis 3 or transverse axis 4 it was installed. Since traffic regulations prescribe for all vehicles to operate a directional or turn signal switch 5 when changing the travel direction of the vehicle, for instance, from direction 13 to direction 17, the link-up of this vehicle or system link-up signal with the multichannel, sensor measuring device 2 of the data acquisition apparatus 1, which is designed for acquiring or logging the vehicle dynamics, is advantageous in order to perform a directional assignment.

The measuring device 2 of the data acquisition apparatus 1 contains sensors of different types for acquiring different physically measured quantities. In the application of an accident data memory system the parameters for acceleration and traveling direction are of a special interest.

Viewed physically, these parameters selected by way of an example, represent vectors. In practical applications, it is sufficient to project these vectors respectively into the two dimensional horizontal plane of movement of the vehicle and to there resolve these directional components which correspond to the vehicle's longitudinal axis 3 and to the vehicle transverse axis 4 which lies orthogonally thereto.

Acceleration sensors 10, which are used routinely for such motor vehicle applications, are only capable of acquiring accelerations along one of three-dimensional or space axes. Therefore, it is necessary to arrange two such sensors at right angles, or orthogonally, to one another in a measuring apparatus, in order to acquire the two-dimensional components of the acceleration a applied to the vehicle. It was found to be appropriate to arrange one acceleration sensor 10 in the longitudinal direction of the vehicle and the second acceleration sensor transversely thereto. The acquisition of the vehicle acceleration a is necessary in order to determine the rotational movements of the vehicle.

Similar considerations apply to the acquisition of the traveling direction of the vehicle. A magnetometer or magnetic field sensor 11 is used as a sensor for the acquisition of this parameter, wherein the earth's magnetic field B, which is assumed to pass along straight lines through the vehicle, are sensed. The magnetic field B or flux lines do not run parallel to the longitudinal axis 3 of the vehicle. Therefore, they must also be acquired as two dimensional vector components.

The magnetometer utilized in the preferred embodiment is a sensor which is effective only in one of three-dimensional or space directions, so that two identical sensors must be arranged in the measuring device 2 orthogonally with respect to one another. Due to the availability of the measured parameters in vector form, the sensors acquiring same are respectively present at least in pairs and in the shape of converter types having identical constructions and further which may be rigidly arranged on a printed circuit board at right angles to one another. These sensors may be herein referred to as "identical or similar sensors". It is also possible that the sensor or measuring arrangement could be supplemented by the addition of an additional identical or similar sensor or converter, if the application requires sensing in a three dimensional coordinate system.

Various operational principles can be utilized in order to provide the acceleration sensors 10 utilized in the present invention. For instance, piezoresistive sensors can be used, which operate in a wheatstone bridge configuration and which generate a voltage at an output. Similarly, magnetoelastic or capacitive sensors may be utilized, which may be operated in an analog or digital resonant or oscillation circuit and which issue a frequency or pulse having a modulated output signal if acted upon by an acceleration. The operating principles of the various sensors, however, do not form a part of the present invention.

The magnetic field sensors 11 which sense the earth's magnetic field B for a determination of the travel direction of the vehicle, may consist of a coil arrangement which reacts to the magnetic flux by the geo-magnetic flux density, which is assumed to be constant at a given measuring instant, as far as its direction in space and its amount are concerned. The direction of the earth's magnetic field B is thus the reference magnitude with respect to which the relative position of the measuring device 2, which is rigidly installed in the vehicle 6, is determined. If the vehicle 6 is not moving in a straight line in the earth's magnetic field B, the flux in the coil of the magnetometer 11 changes. According to the law of induction, the flux changes generate voltage signals, which can be evaluated by an electronic circuit (not shown).

If the magnitudes measured in the two-coordinate system are brought into relationship with one another, for example, by means of trigonometric functions, an angle can be obtained which is indicative of the instantaneous deviation of the momentary traveling direction of the vehicle 6 from the magnetic north pole. In order to reconstruct a vehicle's 6 motion path or track, data is continuously measured and stored in the previously described manner. Since the distance traveled in both directions of a motion plane by a vehicle 6 can be obtained by twice integrating the acceleration a of the vehicle, it is possible to reconstruct the motion track or path of the vehicle. If the time units are selected to be sufficiently small, within which the segments covered are arranged next to one other in a directionally correct manner, sufficiently smooth curves may be generated in the motion evaluation. The reconstruction of the motion path or track is performed, however, by an external computer (not shown). The reconstruction process does not form part of the present application. The data acquisition apparatus, which may be an accident data memory, accumulates only the data measured in the vehicle 6. Thus, the present invention merely deals with the measuring and memory storage of data.

An evaluation unit which is utilized in the data acquisition apparatus 1 has another task in addition to the signal processing for the reconstruction of the motion path or track. In the fabrication of the data acquisition apparatus 1, the acceleration sensors 10 and the magnetic field sensors 11, are arranged in pairs in the apparatus 1. The data acquisition apparatus leaves the factory in the shape of a neutral "black box". Only upon the installation of the apparatus into the vehicle 6, must it be determined, which of the two acceleration sensors 10 is to acquire the acceleration component $a_x$ in the vehicle's 6 longitudinal direction and which is to acquire the transverse acceleration component $a_y$. The same applies to the measuring arrangement for the determination of the direction of travel by the magnetic field sensors 11.

The method and apparatus of the present invention provides a great deal of freedom for the user as far as the selection of the installation position of the apparatus is concerned. While the available space conditions differ from one type of vehicle to another, generally, these spaces are very confined. Therefore, the data acquisition apparatus 1 is intended to rapidly and reliably recognize, which sensor acquires the acceleration a or the magnetic flux B in a given three-dimensional direction. Therefore, a signal link-up is performed in the evaluation unit which leads to a correct fixation or association of the sensors to the direction of motion of the vehicle 6.

If the directional or turn signal switch 5 is actuated and the vehicle 6 changes its travel direction within a chronological window, defined by a directional or turn signal, one of the two sensors provided for each type of sensor supplies a more pronounced change of the measured values than its counterpart. As a result, the measuring device 2 consists of two sensors for each type of sensor arranged orthogonally with respect to each other. As noted above, this arrangement can be expanded by the addition of a third sensor. The measured value changes are evaluated over a time period, which includes specific lead and/or lag times within and/or about the chronological time window, which is determined by the directional or turn signal switch 5, by comparing the signal changes of the sensors of each type with one another. The longitudinal dynamic values, for instance, do not change in the same significant manner as compared to their values before and after time intervals fixed by the directional or turn signal. The assignment as to which sensor of the measuring device 2 acquires the transverse dynamics is determined by comparing both sensor signal changes. The sensor which supplies the more significant of the measured signal changes within a specific time interval is associated with a specific direction in space.

For determining which of two similar sensors is associated with a specific direction in space, the evaluation unit of the data acquisition apparatus 1 includes means 20 for storing the signals generated by the travelling direction sensors 10, means 21 for logically coupling each of the signals generated by the sensors 10 and stored in storing means 20 with a signal associated with the direction of movement or link-up signal, which is generated by the turn signal switch or any other appropriate means, as it will be discussed below, and means 22 for determining which of the two sensors 10 is associated with the vehicle movement (travelling) direction.

The location of the data acquisition apparatus 1 in the vehicle 6, which for instance may be at position 1a/2a or position 1b/2b, generally, is not changed after initial installation. Therefore, the assignment conditions can be considered as being constant after the initial location is determined. Nonetheless, if special circumstances require, this location relationship can be changed over from time to time or even continuously. The location relationship of the sensors (the assignment conditions) are determined in the same manner as they are determined immediately after installation of the data acquisition apparatus in the vehicle.

The actuation of the directional or turn signal switch 5, before changing the travel direction of the vehicle 6 is prescribed driving discipline. Since motions along other than a straight line are part of the usual operational conditions of a vehicle, the data acquisition apparatus 1 arrives, within a very short time at a defined state or condition which is required for reconstructing the motion path or track of the vehicle 6. Generally, this is achieved at the start of driving the vehicle 6 or at least a short time thereafter.

Apart from the utilization of the directional or turn signal as a means to provide a system link-up, other signal link-ups are also conceivable in order to achieve the automatic determination of the assignment of direction sensors to the moving direction of the vehicle 6.

Figure 2:
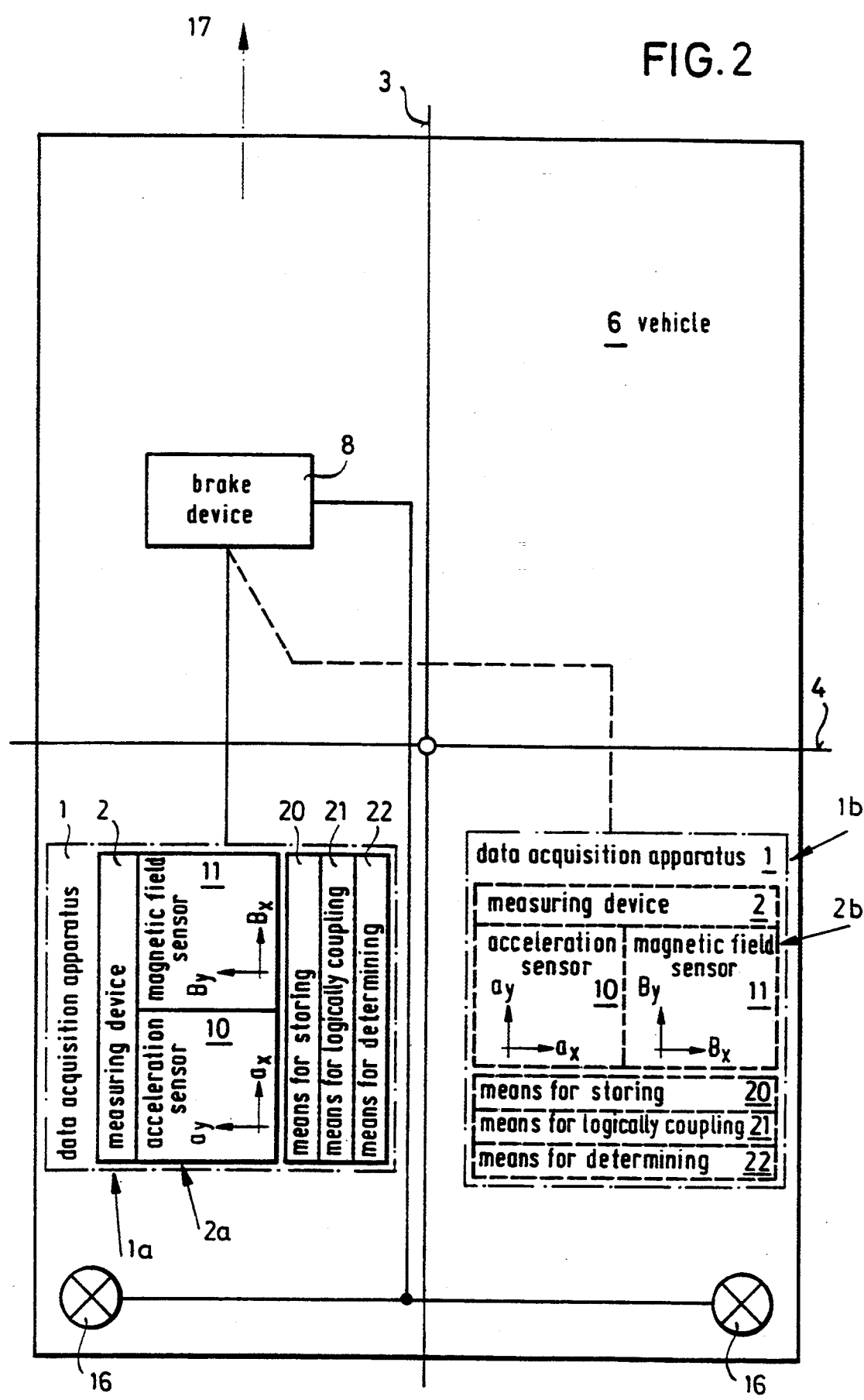
FIG. 2 illustrates an alternate embodiment of a data acquisition apparatus which is the subject of the present invention wherein a brake signal is utilized as the vehicle or system link-up signal.

FIG. 2 illustrates a second embodiment of the apparatus of the present invention. In this embodiment, the system link-up signal which is used for recognizing or identifying those sensors, which are assigned to the longitudinal direction of the vehicle 6 and thus to the usual main direction of movement of the vehicle 6, is generated by the brake device 8 of the vehicle 6. It can be determined by purely practical considerations, from which component of the brake device 8 the system link-up signal can be tapped.

The first step of the method and apparatus of the present invention consists of comparing the output signals of the identical sensors with one another. Thus, the signal of acceleration sensor 10 for acceleration component $a_x$ is compared with the signal of the acceleration sensor 10 for acceleration component $a_y$. The same comparison is performed for the respective signals for the magnetic field sensors 11. This comparison of the signals occurs continuously while the vehicle 6 is in motion. Herein, after a short traveling period, it is determined that the measured signal shape $a_x$ differs significantly from $a_y$ and $B_x$ differs significantly from $B_y$. Not only are the signals of the identical sensors compared with one another as to their absolute magnitudes, but the time derivatives (d/dt) of these signals may also be compared with one another and the results obtained utilized in the method and apparatus of the present invention. The sensor which supplies the more significant of the measured signal changes within a specific time interval is associated with a specific direction in space.

Assuming that the acceleration sensor 10 associated with the signal $a_x$ is arranged appropriately in the direction of the longitudinal axis 3 of the vehicle 6, it acquires the acceleration along the longitudinal axis 3 of the vehicle 6, which is considerably greater in magnitude then the vehicle's transverse acceleration component $a_y$ which is directed orthogonally thereto, which condition only occurs when driving through a curve. In order to confirm this assumption, the method and apparatus of the present invention performs an additional comparison in the evaluation unit. For example, there occurs a system link-up of the measured signals $a_x$ and $a_y$ with the brake signal of the vehicle 6. If the brake device 8 of the vehicle 6 is operated during travel, the vehicle decelerates, meaning that a negative acceleration arises in the direction of the vehicle's longitudinal axis 3. In this instance, the method and apparatus of the present invention consists in linking, within a preset observational time period, the measured signals $a_x$ and $a_y$ with the system link-up signal produced by the brake device 8. If the brake signal, as well as a pronounced change of the $a_x$ signal occurs simultaneously, then a determination is made that the sensor for the $a_x$ signal senses the acceleration along the longitudinal axis 3 of the vehicle 6.

As soon as the system link-up signal, which in this example, has been generally designated as a brake signal, appears and the evaluation unit identifies a deceleration exceeding a preset value which may, for instance be more than 0.2 g, in one of the acceleration sensors 10 arranged orthogonally with respect to each other, the measuring device 2 of the data acquisition apparatus 1 automatically recognizes by this link-up and evaluation which sensor 10 is to be assigned to the longitudinal direction. This occurs because the measured signals of the acceleration sensor assigned to the vehicle's travel direction changes in a significantly different manner, for instance by a larger signal deviation, during a braking process, or during a specific time interval, than the measured signal of the sensor's counterpart located orthogonally thereto. An evaluation of threshold values can also be performed, optionally and additionally, by a link-up with the brake signal.

In the above example, the $a_x$ signal was compared with the system link-up signal, because the $a_x$ signal has generally been found to be the stronger signal in the continuous comparison with the $a_y$ signal. Otherwise the $a_y$ signal would have been linked with the same system link-up signal during an observational time period determined by the system link-up signal. The initial occurrence of the system link-up signal also starts a time counter (not shown), which activates the system link-up signal function for a preset period of time and which switches itself automatically off either after expiration of the preset time period or after the system link-up process, which leads to the association of a sensor to one coordinate of spatial direction, has occurred. This determination can be verified during the ensuing course of the vehicle's travel or it can be stored as a one time determined fixed assignment. This latter procedure is acceptable as long as the installation position of the data acquisition apparatus 1 in the vehicle 6 has not been changed.

In the embodiment of FIG. 1, if the directional or turn signal switch 5 has been operated by the operator, a travel direction change is expected and with this, also a change of the measured value of acceleration sensor 10 which requires a transverse acceleration. The signals of the sensor 10, arranged in direction of the vehicle's longitudinal axis 3, can change by only a small amount provided the directional or turn signals 15 are operating. The signals of the acceleration sensor 10, arranged transversely to the vehicle 6, however, will experience a steep rise and thereafter a steep fall. In this manner, the measured signal changes in a more significant manner then that of its counterpart sensor. Thus, the assignment is made in such a way that the sensor with the greater change of the measured value senses the transverse acceleration during operation of the directional or turn signal.

Figure 3:
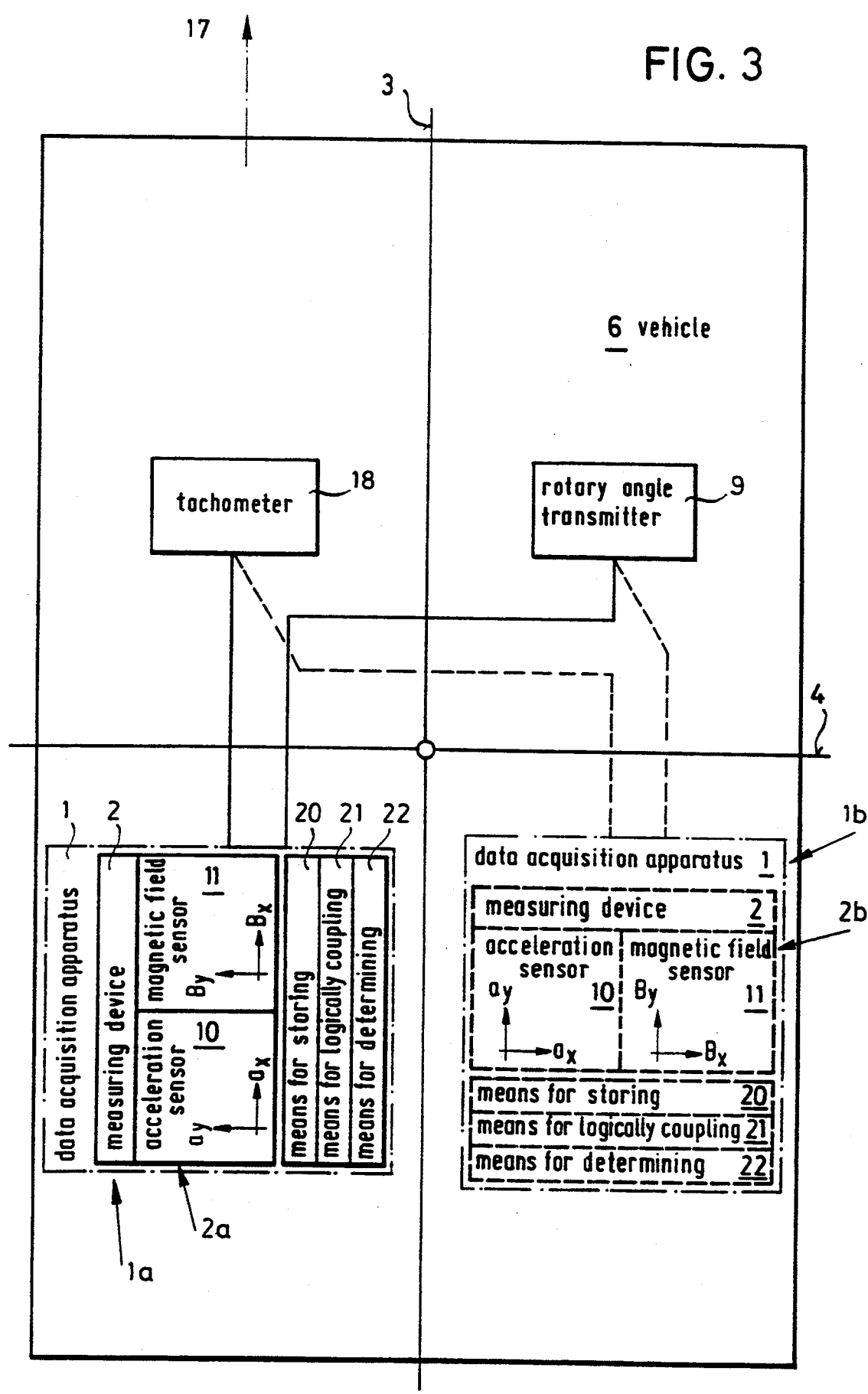
FIG. 3 illustrates another alternate embodiment of a data acquisition apparatus which is the subject of the present invention wherein a rotary angle transmitter signal is utilized as the vehicle or system link-up signal.

FIG. 3 illustrates a third embodiment of the present invention whereby the system link-up signal is generated by a rotary angle transmitter 9. The rotary angle transmitter 9 issues a system link-up signal to the evaluation unit of the data acquisition apparatus 1 which signifies a constant angle of movement, which is preferably the main direction of movement of the vehicle 6 within a preset chronological window. An automatic assignment of the installation position of the sensors can occur to the principal axes of the vehicle 6 by the system link-up signal of this angular signal along with the measured signals of the acceleration sensors 10. The association occurs by means of the link-up with the system link-up signal of the rotary angle transmitter 9, which, may be attached to the steering wheel (not shown) of the vehicle 6 in order to determine the amount of turn of the steering wheel. In this application, steering angle transmitters, electronic compasses, or similar devices may be utilized as the rotary angular transmitter 9. Further, a vehicle motion signal can, for instance, be tapped from the tachometer 18 of the vehicle 6.

The embodiments described herein are easily realized in that the data acquisition apparatus 1 acquires the system link-up signal as an external status signal and because the apparatus 1 also has therein the sensors 10 and 11. The required comparisons, link-up, and time counting processes can be easily realized by and with a microprocessor. The method and apparatus of the present invention facilitates the installation of the data acquisition apparatus in the vehicle 6 in a user friendly manner. In the case of an accident data memory system, which could be installed easily by anyone, the automatic recognition of the installation position by the apparatus 1 provides important advantages. The present invention dispenses with the need to follow precise installation instructions. The present invention accumulates the data obtained with said data being able to be utilized to reconstruct the motion path or track of a vehicle in a usable manner and with the correct reference to the direction of the vehicle's motion.

The various embodiments are meant to illustrate that the signals of the identical sensors are compared with one another. Not only are the signals of the identical sensors compared with one another as to their absolute magnitudes, but the time derivatives (d/dt) of these signals may also be compared with one another and the results obtained utilized in the method and apparatus of the present invention. The generated signal which displays the greater change is linked with a system link-up signal which is produced by vehicle system whose relationship to the longitudinal and transverse axis of the vehicle is known. By means of this link-up, it is determined in which direction the sensor showing the more significant change is arrived at in the vehicle 6. The counterpart sensor is arranged orthogonally to this first sensor by the manufacturer so that its direction is then also known.

The present invention has been described herein in various embodiments. It should be noted, however, that the embodiments are illustrative of the method and apparatus of the present invention and are not meant to be a limitation thereof. Accordingly, the present invention encompasses all variations and/or modifications to the embodiments described herein with the scope of the present invention defined by the claims which follow.

We claim:

1. A method for the automatic determination of the assignment of directional sensors which are associated with the movement direction of a vehicle which comprises the steps of:
    generating at least two first signals from similar sensors which are indicative of said movement direction of the vehicle;
    storing said first signals;
    logically coupling said first signals of the similar sensors with a second signal which is generated by a vehicle subsystem which is associated with the movement direction of the vehicle; and
    determining which one of the similar sensors is associated with said vehicle movement direction defined by said second signal, wherein the determined similar sensor is associated with one of the first signals which has the greatest value among the measured values of the first signals and the time derivatives of the first signals generated by the similar sensors.

2. The method of claim 1, wherein said second signal is one of a directional and turn signals of said vehicle.

3. The method of claim 1, wherein said second signal is a brake signal of said vehicle.

4. The method of claim 1, wherein said second signal is generated by a rotary angle transmitting device of said vehicle.

5. The method of claim 1, wherein said second signal is generated in connection with a curved travel of said vehicle.

6. The method of claim 4, wherein said second signal is generated in connection with a curved travel of said vehicle.

7. The method in any one of claims 1 to 6, wherein the determining of the similar sensor, which is associated with the direction of vehicle movement takes place during a time period when said vehicle subsystem provides said second signal in a predetermined position.

8. An apparatus for the automatic determination of the assignment of directional sensors which are associated with the movement direction of a vehicle which comprises:
    at least two similar sensors each generating a first signal which is indicative of said vehicle direction of movement;
    a means for storing said first signals;
    a means for generating a second signal which is associated with a vehicle subsystem and the direction of movement of the vehicle;
    a means for logically coupling each of said first signals of the similar sensors with said second signal; and
    a means for determining which one of the similar sensors is associated with said vehicle movement direction defined by said second signal, wherein the determined similar sensor has one of the first signals which has the greatest measured value of at least one of the first signals and a time derivative of the first signals generated by said similar sensors.

9. The apparatus of claim 8, wherein said means for generating a second signal is a directional turn switch of said vehicle.

10. The apparatus of claim 8, wherein said means for generating a second signal is a brake device of said vehicle.

11. The apparatus of claim 8, wherein the means for generating a second signal is a rotary angle transmitting device of said vehicle.

12. The apparatus of claim 11, wherein the rotary angle transmitting device operates in connection with the curved travel of the vehicle.

* * * * *